United States Patent
Bentubo et al.

(10) Patent No.: US 9,373,228 B2
(45) Date of Patent: Jun. 21, 2016

(54) POOLED CURRENCY DELIVERY SYSTEM

(71) Applicant: Bank of America Corporation, Charlotte, NC (US)

(72) Inventors: Michelle Bentubo, Orlando, FL (US); Elizabeth Anne Price, Newport, TN (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/508,041

(22) Filed: Oct. 7, 2014

(65) Prior Publication Data

US 2016/0098881 A1 Apr. 7, 2016

(51) Int. Cl.
  *G06F 17/00* (2006.01)
  *G07F 19/00* (2006.01)
  *G07D 11/00* (2006.01)

(52) U.S. Cl.
  CPC .............. *G07F 19/00* (2013.01); *G07D 11/009* (2013.01); *G07D 11/0018* (2013.01); *G07D 11/0021* (2013.01); *G07D 11/0024* (2013.01); *G07D 11/0093* (2013.01); *G07D 11/0096* (2013.01); *G07F 19/20* (2013.01); *G07F 19/202* (2013.01); *G07F 19/203* (2013.01)

(58) Field of Classification Search
  None
  See application file for complete search history.

(56) References Cited

U.S. PATENT DOCUMENTS

| | | | | |
|---|---|---|---|---|
| 6,796,490 | B1 * | 9/2004 | Drummond | G06Q 20/32 235/379 |
| 8,087,581 | B2 * | 1/2012 | Utsumi | G07D 11/0051 235/379 |
| 2003/0046232 | A1 * | 3/2003 | Peters | B65H 29/006 705/43 |
| 2006/0180654 | A1 * | 8/2006 | Meek | G06Q 20/105 235/379 |
| 2009/0107799 | A1 * | 4/2009 | Kadowaki | G07D 11/0081 194/206 |
| 2010/0312701 | A1 * | 12/2010 | Bosch | G06Q 20/1085 705/43 |
| 2013/0262303 | A1 * | 10/2013 | Metral | G07F 19/20 705/43 |
| 2014/0214198 | A1 * | 7/2014 | Depietro | G07F 19/201 700/231 |
| 2014/0263617 | A1 * | 9/2014 | Johnson | G06Q 20/108 235/379 |

* cited by examiner

*Primary Examiner* — Prasad Gokhale
(74) *Attorney, Agent, or Firm* — Weiss & Arons LLP; Michael A. Springs, Esq.

(57) ABSTRACT

A centralized currency delivery system is provided. The system may include two or more transaction stations. Each transaction station may be deployed in a banking center. A banking transaction may be initiated using the transaction stations. Each transaction station may not able to process paper items. The system may include a shared resource. The shared resource may include a shared cash recycler. The shared cash recycler may receive banking transaction information from the transaction stations. Based on authentication information presented at the shared cash recycler, the shared cash recycler may complete the banking transaction initiated at the transaction stations. The shared cash recycler may include two or components that are dedicated to a received banking transaction. The components may remain dedicated to the banking transaction until the banking transaction is completed. Entitlements associated with a transaction station may control use of the components.

17 Claims, 11 Drawing Sheets

POOLED CURRENCY DELIVERY SYSTEM

FIELD OF TECHNOLOGY

Aspects of the disclosure relate to providing apparatus and methods for centralized or pooled currency dispensing within a banking center.

BACKGROUND

Large financial institutions such as banks may operate multiple banking centers. Customers of the bank may utilize the banking center to perform a variety of banking transactions. Banking transactions may include deposits, withdrawals, opening/closing accounts, mortgage services, credit card services or other suitable transactions.

A banking center may include multiple locations within the banking center where a customer may initiate a banking transaction. For example, the banking center may include automated teller machines ("ATMs"), teller stations and/or platform area stations. Initiating a banking transaction may include requesting performance of one or more services offered at a banking center.

Typically, each location within the banking center includes a dedicated device for performing different types of banking transactions. For example, each teller station may include a quick service terminal ("QST"), a check MICR/image scanner, a receipt/valuator printer, a cash dispenser/recycler and/or a branch printer/MICR printer. A QST may include may include a card reader, a numeric keypad, a biometric scanner or any other suitable device.

Purchasing and maintaining each dedicated device increases a cost of operating the banking center. The increased cost of the operating the banking center increases a cost of performing a banking transaction. It would be desirable to reduce costs associated with operating the banking center.

Additionally, a dedicated device may malfunction. In the event of a malfunction, the location associated with the dedicated device may be unable to perform banking transactions that require use of the dedicated device. For example, a currency dispenser within an ATM may malfunction. Until the malfunctioning currency dispenser is repaired the ATM may be unable to process currency withdrawal requests.

Furthermore, each location within the banking center that dispenses currency must be stocked with currency. The cost to stock each location within the banking center may further increase a cost of a banking transaction.

It would be desirable to provide a currency dispensing system that includes redundancy when a device malfunctions. It would further be desirable to provide a currency dispensing system that may be stocked with currency at a central location. Therefore, it would be desirable to provide apparatus and methods for a centralized currency delivery system.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
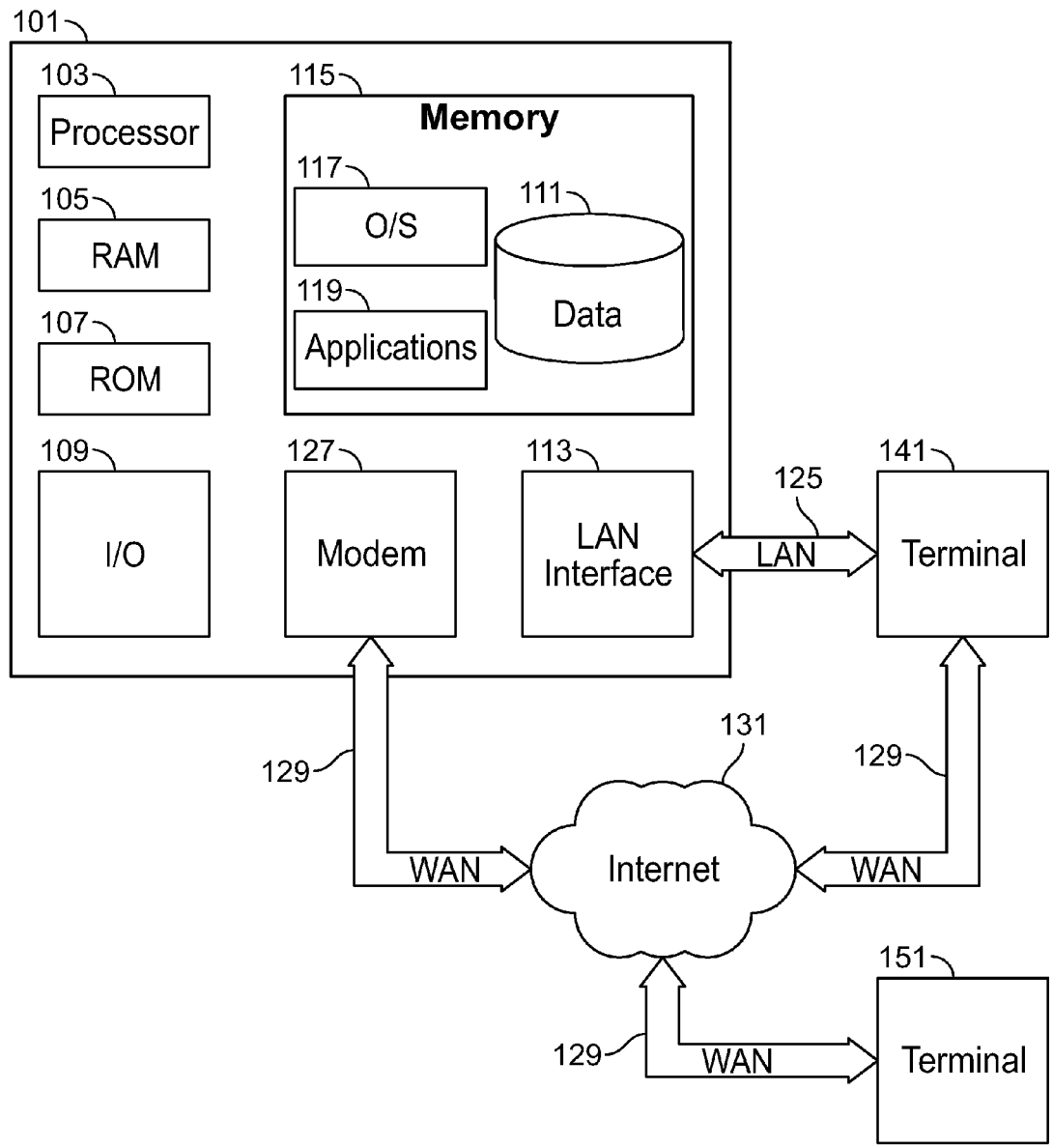
FIG. 1 shows an illustrative apparatus in accordance with the principles of the invention.

Apparatus and methods for a centralized or pooled currency delivery system are provided. Apparatus may include a currency delivery system deployed at a banking center. The banking center may be a "brick and mortar" center. The currency delivery system may include a first transaction station. The first transaction station may be positioned at a first location within the banking center. The currency delivery system may include a second transaction station. The second transaction station may be positioned at a second location within the banking center.

The currency delivery system may include a multi-slot cash recycler. The multi-slot cash recycler may be positioned at a third location within the banking center. The system may include a network. The network may be local to the banking center location. The network may link the first transaction station to the multi-slot cash recycler. The network may link the second transaction station to the multi-slot cash recycler.

The network may allow the first and second transaction stations to each access the multi-slot cash recycler. The network may link any suitable number of transaction stations to the multi-slot cash recycler. The multi-slot cash recycler may be a resource shared by the first and second (or more) transaction stations.

The multi-slot cash recycler may include a processor. The processor may be configured to receive, over the network, a first request for a first amount of cash. The first request may be received from the first transaction station. The processor may be configured to receive a second request for a second amount of cash. The second request may be received from the second transaction station.

The first transaction station may be an ATM. The ATM may be positioned in a lobby of the banking center. The ATM may be positioned outside the banking center. The second location may be located a distance from the first location. The distance may be any suitable distance. For example, the distance may be 5, 10, 15 or 100 feet.

The second transaction station may be a teller workstation. The teller workstation may be located at least fifteen feet away from the first location. For example, the teller workstation may be located at least fifteen feet from an ATM positioned in the lobby of the banking center. The second transaction station may be a tablet computer. The second location may be a lobby leader station within the banking center.

The second transaction station may be a mobile workstation. The mobile workstation may be positioned anywhere within the banking center. The mobile workstation may be joined to the network via a wireless connection. The mobile station may be utilized by a customer or banking center employee. The mobile workstation may be tablet computer or a smartphone.

The multi-slot cash recycler may include a first slot. The first slot may be configured to dispense currency. For example, the system may receive a first request for currency from the first transaction station. In response to receiving the first request, the system may instruct the multi-slot cash recycler to dispense a first amount of cash from a first slot of the recycler. A requestor that initiated the first request may be required to move from the first transaction station to the multi-slot cash recycler to retrieve the first amount of cash.

The multi-slot cash recycler may include a second slot. The second slot may be configured to dispense currency. In response to receiving a second request from the second transaction station, the system may configure the second slot to dispense a second amount of cash. A requestor that initiated the second request may be required to move from the first transaction station to the multi-slot cash recycler to retrieve the second amount of cash.

The multi-slot cash recycler may include any suitable number of slots for dispensing currency. For example, the multi-slot cash recycler may include 2, 3, 10 or 25 slots.

The multi-slot cash recycler may include a first authentication interface. The first authentication interface may be associated with the first slot. The multi-slot cash recycler may include a second authentication interface. The second authentication interface may be associated with the second slot. The multi-slot cash recycler may include an authentication interface for each slot of the recycler.

Each authentication interface may include at least two of: a screen, a card reader, a biometric scanner and a keypad. The authentication interface may be utilized to enter authentication information before the multi-slot cash recycler releases cash from the slot associated with the authentication interface.

For example, a customer may initiate a banking transaction at a transaction station remote from the multi-slot cash recycler. Initiating a banking transaction may include requesting performance of one or more services offered at a banking center. The banking transaction may include a request for a cash withdrawal. The customer may be instructed to proceed to the multi-slot cash recycler to retrieve the cash requested at the transaction station. The customer may approach the multi-slot cash recycler and provide authentication information using the authentication interface.

Authentication information may include information encoded on a bank card issued by the financial institution to a requestor. Authentication information may include a personal identification number ("PIN") issued by the financial institution to the requestor. Authentication information may include a biometric characteristic of the requestor. Authentication information may include any suitable credentials that may uniquely identify a requestor.

Based on the authentication information provided by the customer, the multi-slot cash recycler may identify the customer and identify the banking transaction initiated by the customer at the transaction station. The authentication interface may be associated with one of the multiple slots in the multi-slot recycler. The multi-slot cash recycler may dispense the amount of cash requested by the customer using the slot associated with the authentication interface utilized by the customer.

The multi-slot cash recycler may be configured to match authentication information provided by a requestor using an authentication interface with one of multiple requests for cash received by the recycler. The recycler may dispense an amount of cash corresponding to the matched request using the slot associated with the authentication interface utilized to provide authentication information.

The multi-slot cash recycler may include a connection to a remote computer server. The remote computer server may process authentication information provided using an authentication interface. The remote server may determine whether the provided authentication information is associated with a known requestor or customer of the bank. The remote server may transmit a message to the multi-slot recycler. The message may indicate whether or not the recycler should release cash in response to the provided authentication information. In some embodiments, the remote server may also instruct the recycler how much cash to dispense in response to the provided authentication information.

The multi-slot cash recycler may include a storage bin. The storage bin may hold a cash supply. The cash supply may include bills of different denominations. For example, the cash supply may include any suitable number of one, five, ten, twenty, fifty and/or one-hundred dollar bills. The cash supply may include coins.

The multi-slot cash recycler may include a picker. The picker may be configured to extract at least one bill from the cash supply held in the storage bin. The multi-slot cash recycler may include a validator. The validator may be configured to determine a value of a bill extracted from the cash supply. The validator may confirm that the bills extracted from the storage bin correspond to an amount of cash requested by a requestor at a transaction station. The validator may confirm that the bills extracted from the storage bin correspond to an amount of cash authorized by the remote server (based on provided authentication information).

The multi-slot cash recycler may include a track. The track may be configured to transport one or more bills extracted from the cash supply. The track may include rollers, belts and other suitable mechanisms for transferring bills extracted from the storage bin.

In response to receiving a first request for currency from a first transaction station, the picker may extract a first number of bills from the storage bin. The validator may determine the value of the first number of bills. If the value corresponds to the requested amount, the track may transport the first number of bills to a first slot in the cash recycler. If the value does not correspond to the first amount, the bills extracted by the picker may be returned to the storage bin or to another holding area within the recycler. The multi-slot cash recycler may attempt to extract the requested amount of currency from the storage bin a second time.

In response to receiving a second request from a second transaction station, the picker may extract at least a second number of bills from the cash supply. The validator may determine the value of the second number of bills. The validator may determine whether the value of the second number of bills corresponds to the second requested amount of currency. The track may transport the second number of bills to the second slot in the cash recycler.

The multi-slot cash recycler may include a deposit acceptor. The deposit acceptor may be used to transfer a deposited item into the recycler. Deposited items may include cash, checks or any other suitable items.

For example, the recycler may be configured to receive a request to deposit an amount of cash. The request may be initiated at a transaction station remote from the recycler. In response to receiving the deposit request, the deposit acceptor may be configured to receive cash. The acceptor may transfer the cash into the recycler. The deposited cash may be transferred into a storage bin. A value of the deposited item may be credited to an account of the customer.

Apparatus for a currency delivery system are provided. The currency delivery system may be deployed within a banking center. The system may include a first transaction station. The first transaction station may be positioned at a first location within the banking center. For example, the first transaction may be an ATM located outside the banking center. The first transaction station may be a kiosk located within the banking center. The kiosk may not include a mechanism for dispensing cash or accepting deposits. The kiosk may be a tablet computer.

The system may include a second transaction station. The second transaction station may be positioned at a second location within the banking center. For example, the second transaction station may be a teller workstation. The second transaction station may include one or more features of the first transaction station.

The system may include a staged cash recycler. The recycler may be positioned at a third location within the banking center. The third location may be spaced a distance away from the first and second locations. The distance may be any suitable distance such as 5, 10, 25 or 100 feet.

The system may include a network. The network may link the first transaction station to the staged cash recycler. The network may link the second transaction station to the staged cash recycler. The network may link any suitable number of transaction stations to the staged cash recycler. The staged cash recycler may be a resource shared by two or more transaction stations.

The staged cash recycler may include a processor. The processor may be configured to receive, via the network, a first request for a first amount of cash from the first transaction station. The staged cash recycler may be configured to receive, via the network, a second request for a second amount of cash from the second transaction station.

The staged cash recycler may include a first holding area. In response to receiving the first request, the recycler may extract cash from a storage bin. The recycler may transfer the extracted cash to the first holding area. The first holding area may store the first amount of requested cash until the first requestor accesses the recycler. A requestor may be a banking center customer, a banking center employee or any suitable device, entity or individual.

The first requestor may be required to move from the first transaction station at the first location to the recycler at the third location. During a time when the requestor is moving, the recycler may prepare the requested amount of cash. The recycler may prepare the requested amount cash by extracting cash from the storage bin and transferring the extracted cash to a holding area.

A requestor may be a customer of a financial institution. The requestor may be an employee of the financial institution.

The staged recycler may include an authentication interface. When the requestor arrives at the recycler the requestor may utilize the authentication interface to input authentication information. Authentication information may include information encoded on a bank card, a PIN, a biometric characteristic or any other suitable information that may uniquely identify the requestor.

Authentication information may be used to locate the request for cash initiated at a first transaction station. The staged recycler may identify a holding area that is associated with the request for cash received from the first transaction station. In response to authentication information provided by the requestor, the recycler may dispense the cash within a designated holding area to the requestor. The designated holding area may be associated with the request received from the first transaction station.

As result of preparing the requested cash within the holding area, requested cash may be dispensed immediately after the requestor enters authentication information. Preparing the cash while the requestor moves from a transaction station to the recycler may reduce time the requestor would have had to wait for the recycler to extract cash from a storage bin and validates the extracted cash. The extraction and validation may be performed while the requestor is moving from the transaction station to the staged cash recycler.

A staged cash recycler may include a plurality of holding areas. The recycler may receive a plurality of requests for cash from different transaction stations within a banking center. The recycler may associate each request with a holding area. For each request, the recycler may begin preparing the requested amount of cash while the requestor moves from the transaction station used to initiate the request to the recycler that will dispense the requested cash.

For example, the recycler may receive a first request for cash from a first transaction station. The recycler may receive a second request for cash from a second transaction station. In response to receiving the first request, the recycler may extract and store a first amount of cash in a first holding area. In response to receiving the second request, the recycle may extract and store a second amount of cash in a second holding area.

The first requestor may approach the recycler and enter authentication information using an authentication interface of the recycler. In response to the authentication information provided by the first requestor, the first amount of cash may be released from a first holding area of the recycler. Releasing the first amount of cash may include dispensing the first amount of cash using a slot associated with the authentication interface used by the first requestor.

In some embodiments, a staged cash recycler may include one slot, one authentication interface and multiple holding areas. In some embodiments, a staged cash recycler may include multiple slots and multiple authentication interfaces. Each of the multiple slots may be associated with multiple holding areas.

The staged recycler may include a plurality of authentication interfaces. The staged recycler may include a plurality of slots or cash dispensers. Each slot or cash dispenser may be associated with one of the authentication interfaces. The recycler may dispense cash from a first holding area in response to authentication information entered by a first requestor using the authentication interface. The recycler may dispense cash from a second holding area in response to authentication information entered by a second requestor using the authentication interface.

In some embodiments, two or more holding areas may be associated with one slot or dispenser. The recycler may receive a first request for cash at a first time. In response to the first request, the recycler may transfer cash to a first holding area. The recycler may receive a second request for cash at a second time. The second time may be later than the first time. The recycler may receive the second request after transferring cash to the first holding area. The recycler may store cash in the first holding area before cash is stored in a second holding area.

The recycler may be configured to dispense cash from any of the holding areas in response to entered authentication information. The recycler may be configured to dispense cash from the second holding area before dispensing cash from the first holding area. For example, a second requestor may reach the recycler and enter authentication information before a first requestor. In response to the authentication information entered by the second requestor, the recycler may dispense cash held in the second holding area before dispensing cash held in the first holding area.

A staged cash recycler may include a storage bin holding a cash supply. The cash supply may include any suitable number of bills. The cash supply may include different denominations. For example, the cash supply may include one, five, ten, twenty, fifty and one hundred dollar bills. The cash supply may include coins.

The recycler may include a picker. The picker may be configured to extract at least one bill or coin from the cash supply. The recycler may include a track. The track may be configured to transport the extracted bill or coin. For example, the track may transport the extracted bill or coin to a holding area or to a dispenser. The recycler may include a validator. The validator may be configured to determine a value of a bill or coin extracted from the cash supply.

In response to receiving a first request from a first transaction station, the picker may extract a first number of bills from the storage bin. The validator may determine the value of the first number of bills. The validator may confirm that the value of the first number of bills corresponds to the first requested amount of currency. The validator may confirm that the picker has not extracted too many or too few bills.

The track may transport the first number of bills to a first holding area. In response to receiving an entry of valid authentication information from a first requestor, the recycler may dispense the first number of bills to the first requestor.

In response to receiving a second request from a second transaction station, the picker may extract a second number of bills from the cash supply. The validator may confirm that the value of the second number of bills corresponds to the second requested amount of currency. The validator may confirm that the picker has not extracted too many or too few bills.

The track may transport the second number of bills to the second holding area. In response to receiving an entry of valid authentication information from a second requestor, the recycler may dispense the second number of bills to the second requestor.

The recycler may be configured to return extracted cash stored within holding area to a storage bin. The recycle may return the extracted cash to the storage bin after a pre-determined time interval. For example, a recycler may extract cash in response to a received request. The recycler may return the extracted cash to the storage bin if the requestor does not enter valid authentication information within a pre-determined time frame.

The pre-determined time frame may be measured from a time the request was initiated at a transaction station. The pre-determined time frame may be measured from a time the request was received by a cash recycler. The pre-determined time frame may be determined based on an estimated time for the requestor to move from a transaction station to the recycler. The pre-determined time period may be measured from any suitable step associated with a processing of a request for a banking transaction.

Methods for delivering currency within a banking center are provided. Methods may include using a first transaction station to initiate a first request for a first amount of cash. The first request may be initiated by a first requestor using the first transaction station. The requestor may be a customer of a financial institution. The requestor may be an employee of the financial institution. Methods may include using the first transaction station to direct the first requestor to a shared cash recycler.

Methods may include using a second transaction station, initiating a second request for a second amount of cash. The second request may be initiated by a second requestor using the second transaction station. Methods may include, using the second transaction station, directing the second customer to the shared cash recycler. Methods may include, using a network within the banking center, transferring the first request to the shared cash recycler. Methods may include, using a network within the banking center, transferring the second request to the shared cash recycler.

Methods may include using an authentication interface to authenticate the first requestor at the shared recycler. In response to authenticating the first customer, methods may include retrieving the first amount of cash from a storage bin within the staged cash recycler. Methods may include using the shared cash recycler to dispense the first amount of cash to the first requestor.

Methods may include using an authentication interface to authenticate the second requestor at the shared recycler. In response to authenticating the second requestor at the shared recycler, methods may include retrieving the second amount of cash from the storage bin within the staged cash recycler. Methods may include dispensing the second amount of cash to the second requestor.

Methods may include authenticating the first requestor using a first authentication interface of the shared recycler. Methods may include authenticating the second requestor using a second authentication interface of the shared recycler.

Methods may include dispensing the first amount of cash from the shared cash recycler using a first slot. Methods may include dispensing the second amount of cash from the shared recycler using a second slot.

Methods may include a shared recycler receiving a third request for a third amount of cash from a teller or other banking center employee workstation. Methods may include using the teller workstation to direct a teller to the shared recycler. Methods may include using the network within the banking center to transfer the third request to the shared recycler.

Methods may include using the shared recycler to authenticate the teller or other banking center employee. In response to authenticating the teller, the methods may include retrieving the third amount of cash from the storage bin within the staged cash recycler. Methods may include dispensing the third amount of cash to the teller.

Methods may include using a teller, or other banking center employee workstation, transmitting a request to deposit an amount of cash. Methods may include directing a teller to the shared recycler. For example, a message may be displayed on the teller workstation informing the teller to proceed to the shared recycler. Methods may include using the network within the banking center to transfer the deposit request to the shared recycler.

Methods may include authenticating the teller at the shared recycler. In response to authenticating the teller, the methods may include activating an acceptor of the staged cash recycler. Methods may include using the acceptor to transfer a deposit to a storage bin within the staged cash recycler.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention. The methods of the above-referenced embodiments may involve the use of any combination of methods, portions of methods, partially executed methods, elements, one or more steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to configure recyclers, configure transaction stations, process authentication information, control movement of currency within a recycler, process banking transactions or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
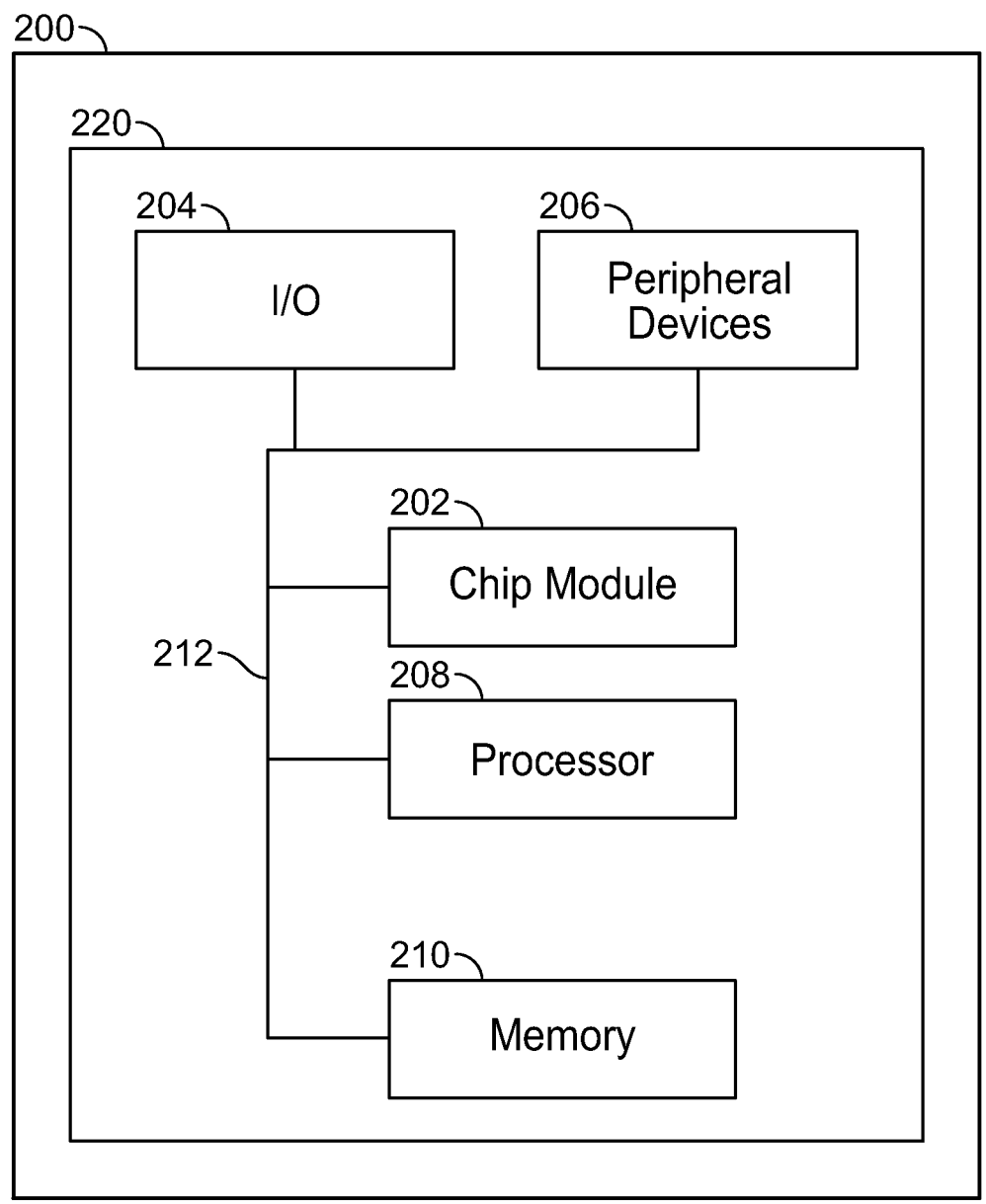
FIG. 2 shows an illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: customer profiles, banking transactions, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
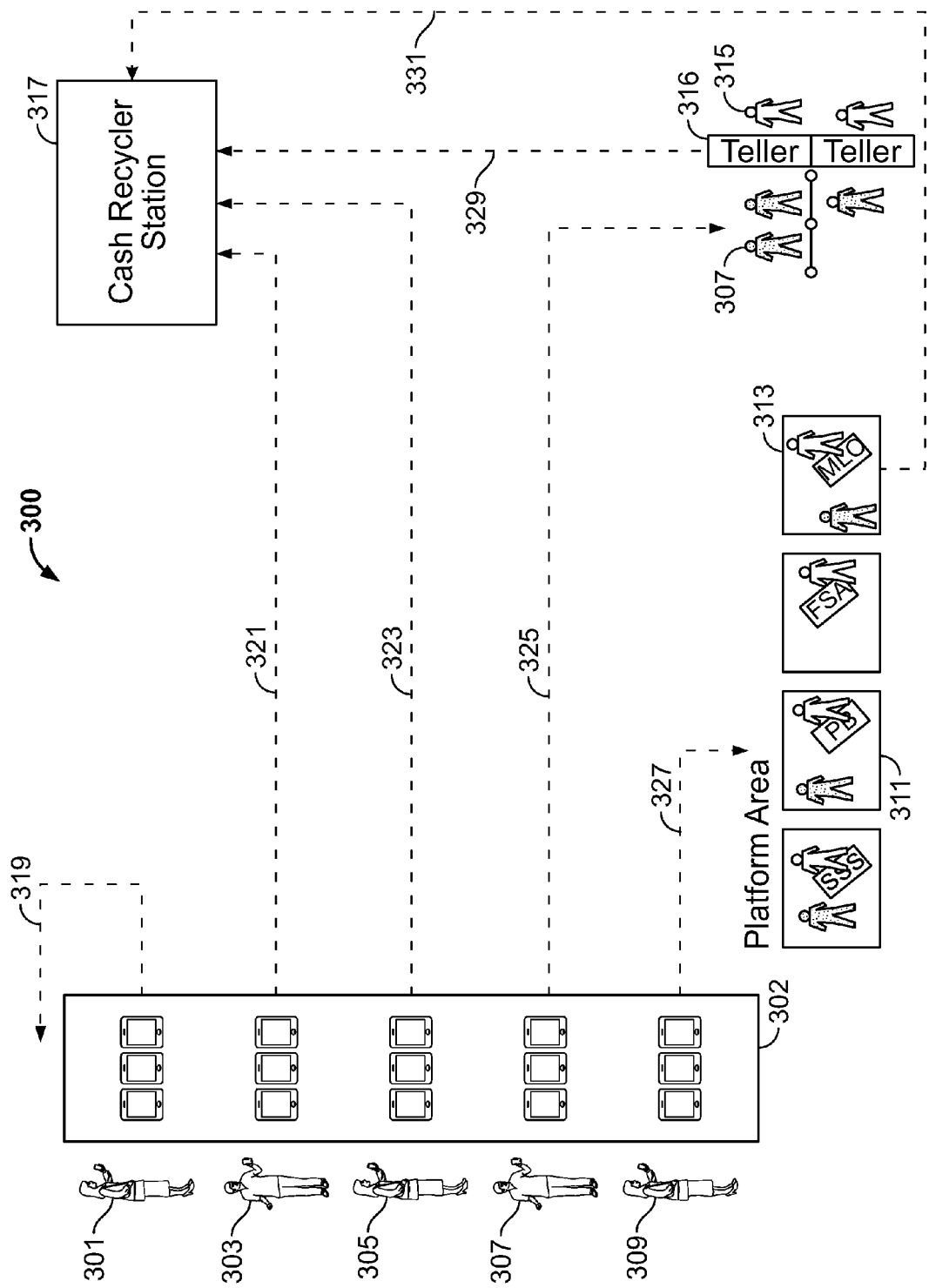
FIG. 3 shows an illustrative arrangement in accordance with the principles of the invention.

FIG. 3 shows illustrative arrangement 300 within a banking center. Arrangement 300 shows that customers may initial approach transaction station 402. Transaction station 402 may include a row or tier of tablet computers. Each tablet computer may not have an ability to accept deposits or dispense cash.

Arrangement 300 shows customer 301 initiating a banking transaction at transaction station 302. Path 319 shows customer that customer 301 completes the banking transaction at the transactions station 302 and exits the banking center.

Arrangement 300 shows customers 303 and 305 initiating banking transactions at transaction station 302. Paths 321 and 323 show that customers 303 and 305 are directed to cash recycler station 317. At transaction station 302 customers 303 and 305 may have requested a banking transaction that includes a deposit or withdrawal. Customers 303 and 305 will approach cash recycler station 317 to complete their banking transactions initiated at transaction station 302.

Cash recycler station 317 may begin to extract cash requested by customers 303 and/or 305 while customer 303 and 305 move along paths 321 and 323. Cash extracted on behalf of customers 303 and/or 305 may be stored in a holding area of cash recycler station 317.

Arrangement 300 shows customer 307 initiating a banking transaction at transaction station 302. Path 325 shows that transaction station 302 directs customer 307 to teller station 316. Customer 307 may have requested a bank check or other banking transaction that cannot be performed at transaction station 302. For example, teller 315 may need to view identification presented by customer 307 to authenticate customer 307. Path 329 shows that from teller station 316, customer 307 may be directed to cash recycler station 317. Customer 307 may retrieve a requested bank check from cash recycler station 317.

Arrangement 300 shows customer 309 initiating a banking transaction at transaction station 302. Path 327 shows customer 309 being directed to platform area station 311. Platform area stations may provide specialized banking transaction services. Specialized banking transaction services such as opening new accounts, mortgage products, credit card products or other suitable banking transactions.

Arrangement 300 shows a customer conducting a banking transaction at platform area station 313. Path 331 shows that the customer may be directed from platform area station 313 to cash recycler station 317. For example, the customer at platform station 313 may wish to deposit funds into a newly opened account. The customer may be directed to approach cash recycler station 317 to make the deposit.

Arrangement 300 shows that cash recycler station 317 may be shared by the different transaction stations positioned within a banking center.

Figure 4:
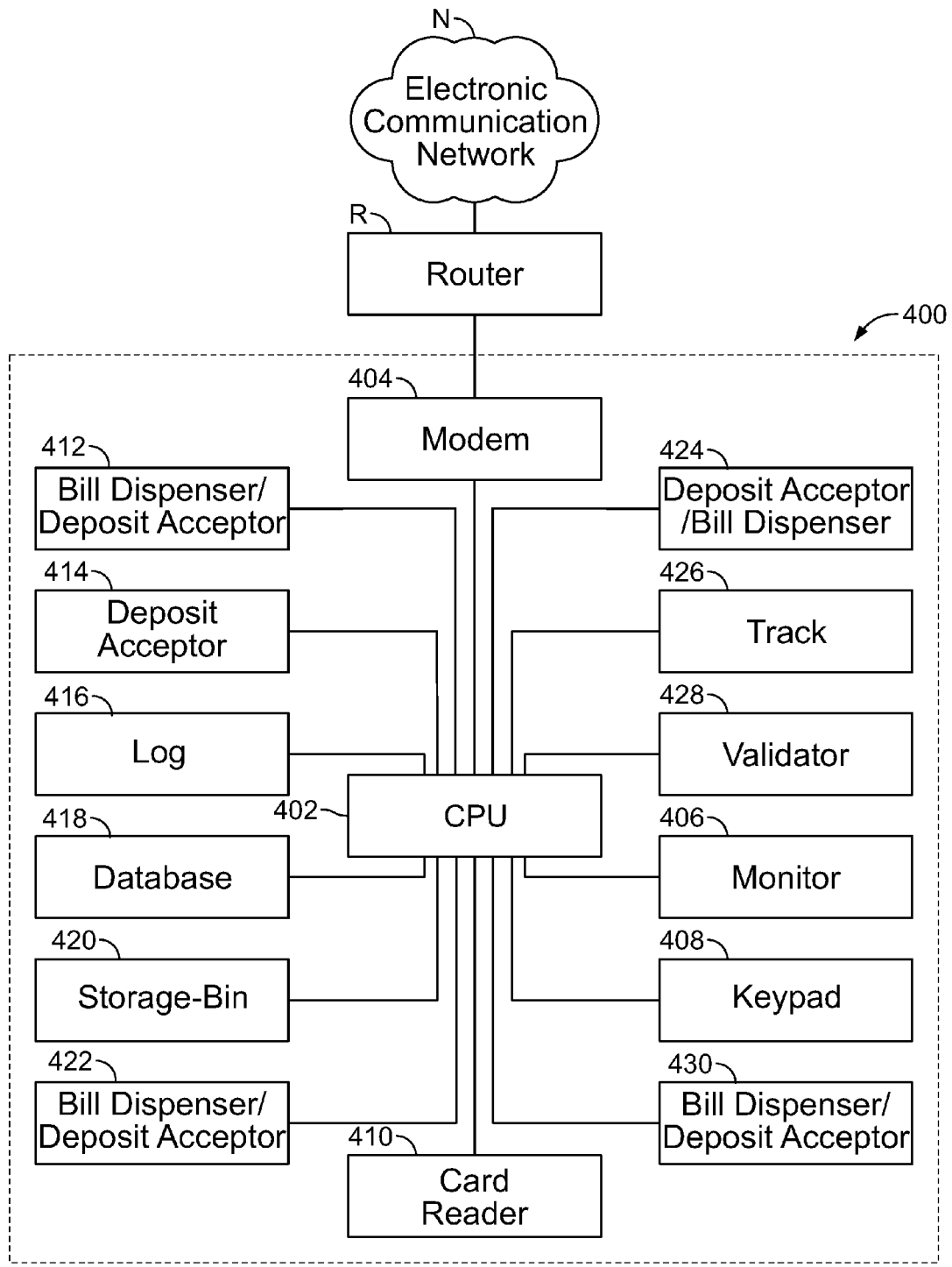
FIG. 4 shows an illustrative apparatus in accordance with the principles of the invention.

FIG. 4 shows components of illustrative cash recycler station 400. Recycler 400 may be controlled by CPU 402. CPU 402 may include one or more features of server 101 (shown in FIG. 1). CPU 402 may exchange information with electronic communication network N via modem 404 and router R. Exchanged information may include banking transaction information. A banking transaction may be initiated using a transaction station such as transaction station 302 (shown in FIG. 3). The transaction station may transmit banking transaction information to recycler 400 using network N. Recycler 400 may receive the transmitted banking transaction information using network N, router R and/or modem 404.

Recycler 400 may communicate with computer servers outside of a banking center using network N and router R. For example, recycler 400 may transmit authentication information entered by a customer to a remote computer server using network N and router R. The remote server may evaluate the authentication information and transmit a response to recycler 400. Recycler 400 may receive the response from the remote server using network N and router R.

The response may indicate whether the authentication information is associated with a valid customer profile. The response may indicate whether the authentication information is associated with banking transaction initiated at a transaction station within the banking center. Information received from a transaction station or remote computer server may be stored in database 418.

CPU 402 may receive information from a customer via monitor 406, keypad 408, card reader 410, deposit acceptor 414, database 418 or item acceptors/dispensers 412, 424, 422, or 430. The information received from the customer may include authentication information.

CPU 402 may instruct recycler 400 to dispense bills through item acceptors/dispensers 412, 424, 422, or 430. CPU 402 may instruct an item dispenser to retract any currency remaining in the item dispenser after expiration of a time-out period.

Recycler 400 may receive a request to deposit bills or checks. CPU 402 may activate a deposit acceptor such as deposit acceptor 414 or bill dispenser/deposit acceptor 422. Activating the acceptor may include instructing the acceptor to open and accept one or more tangible items presented by a requestor.

CPU 402 may control a transfer of bills from storage bin 420. CPU 402 may control a transfer of items using track 426. Track 426 may include a network of rollers, belts, belts, channels, pickers or any suitable components. CPU 402 may control movement of items along track 426. Track 426 may link bill acceptors/dispensers of recycler 400 to storage bin 420.

CPU 402 may record information received from one or more components of recycler 400. CPU 402 may record information received from one or more transaction stations that communicates with recycler 400 using network N. CPU 402 may transmit information received from one or more components of recycler 400 to electronic communication network N using modem 404 and router R.

Log 416 within recycler 400 may store recorded information. For example, log 416 may store information associated with a dispensing of cash. Log 416 may store a time of a dispensing, a banking transaction session ID, authentication information presented, a requested amount of cash, a customer account or any suitable information. CPU 402 may control a recording of the information stored in log 416.

CPU 402 may instruct track 426 to transfer bills from storage bin 420 to validator 428. Validator 428 may determine a value and/or denomination of bills. Validator 428 may transmit information to CPU 402. CPU 402 may verify that the value and/or denomination of the bills conform to a received customer request. CPU 402 may instruct validator 428 to transfer the bills to a dispenser.

Recycler 400 includes a plurality of bill dispensers/acceptors 412, 414, 416, 422, 424 and 430. Each of the bill dispenser/acceptors may be used to accept deposits and/or dispense cash for a different banking transaction. The different banking transactions may be received by recycler 400 from different transaction stations within a banking center.

Figure 5:
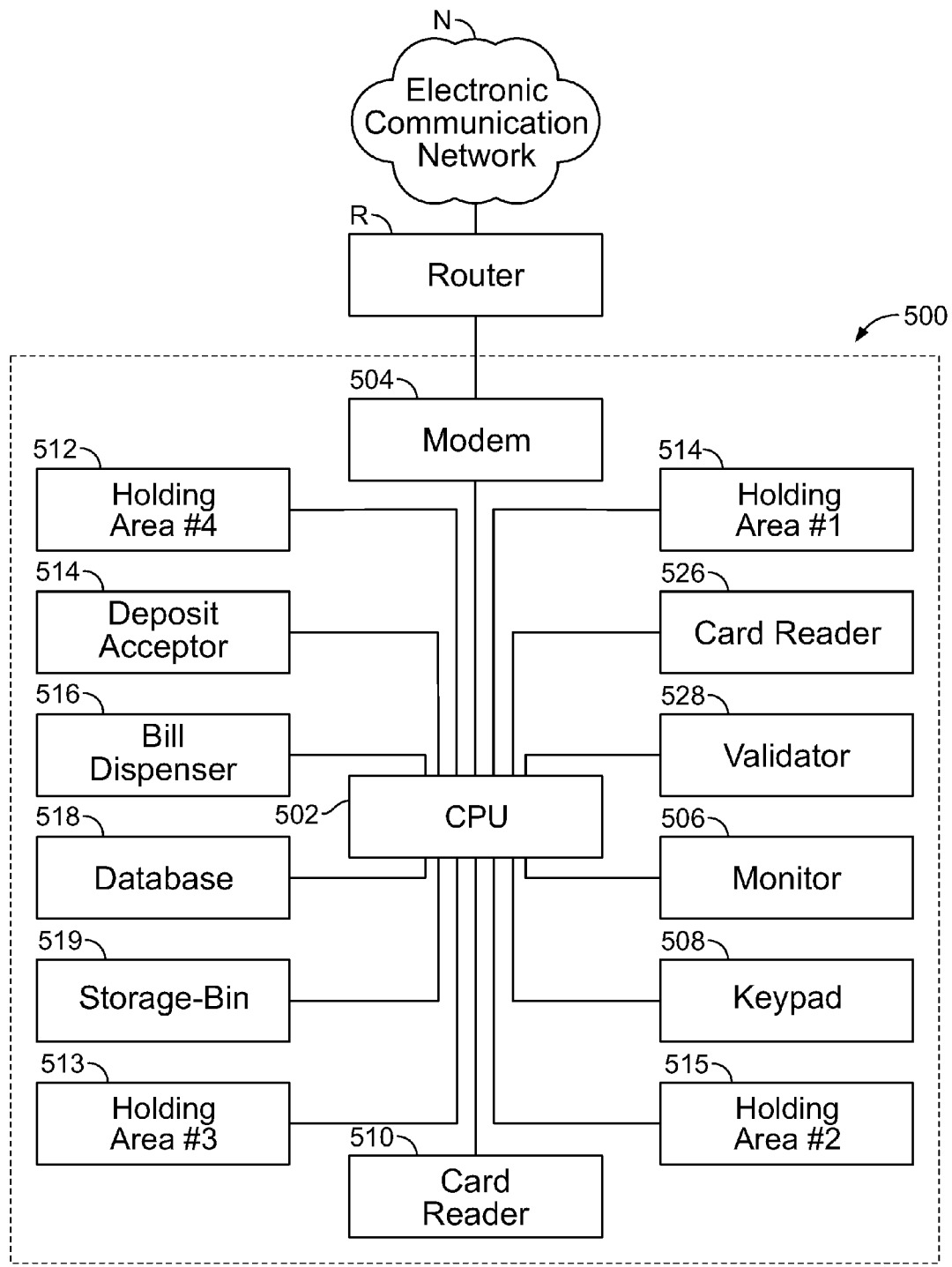
FIG. 5 shows an illustrative apparatus in accordance with the principles of the invention.

FIG. 5 shows illustrative components of recycler 500. Recycler 500 may include one or more features of recycler 400 (shown in FIG. 4). Recycler 500 includes holding areas 512, 513, 514 and 515. The holding areas may be used to prepare currency for collection by a requestor. The requestor may request currency using a transaction station, such as transaction station 302 (shown in FIG. 3). The transaction station may be spaced a distance away from recycler 500. The transaction station may instruct the requestor to collect the requested currency from recycler 500.

The requestor may leave a transaction station and move toward recycler 500. While the requestor is moving toward recycler 500, recycler 500 may begin to prepare the requested currency. Recycler 500 may extract the value and denomination of currency requested by the requestor. Recycler 500 may extract the currency from storage bin 519. Recycler 500 may use validator 528 to confirm the value and denomination of extracted currency.

After confirming the value and denomination, recycler 500 may transfer the extracted currency to one of holding areas 512, 513, 514 or 515. Recycler 500 may store the extracted currency in a holding area until the requestor who submitted requested the currency enters authentication information at recycler 500. In some embodiments, if the requestor does not enter authentication information at recycler 500 within a predetermined time, the currency stored in the holding area may be returned to storage bin 519.

The requestor may approach recycler 500 and present authentication information using monitor 506, keypad 508 and card reader 526. Recycler 500 may verify the authentication information using network N and router R. In response to verification of the authentication information, recycler 500 may transfer the currency out of the holding area and dispense the currency to the authenticated requestor. Extracting the currency and storing the extracted currency in a holding area may reduce an amount of time the requestor must wait for the requested currency after entering authentication information at recycler 500.

Figure 6:
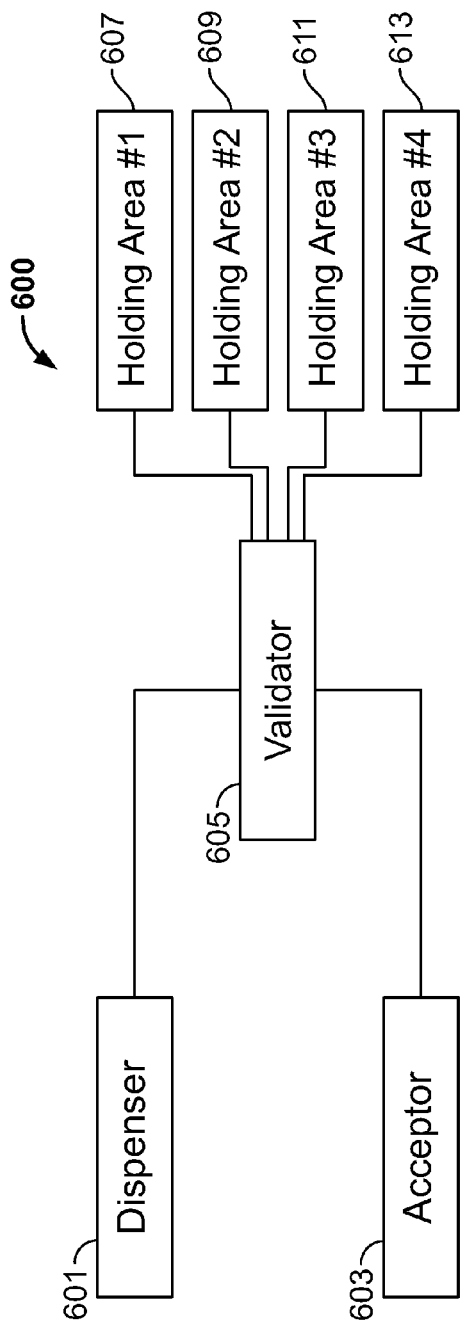
FIG. 6 shows an illustrative apparatus in accordance with the principles of the invention.

FIG. 6 shows illustrative recycler architecture 600. Architecture 600 includes dispenser 601 and acceptor 603. Dispenser 601 and acceptor 603 may be part of a shared recycler such as recycler station 317 (shown in FIG. 3) or recycler 500 (shown in FIG. 5). Acceptor 603 may transfer deposited items to validator 605. Validator 605 may determine a value and/or denomination of the deposited items. Deposited items may be temporarily held in one of holding areas 607, 609, 611 or 613.

Deposited items may be temporarily held in a holding area while one or more properties of the deposited item are verified. For example, the customer may be asked to confirm an amount on a check or a system may verify that a hold/stop has not been placed on a deposited check.

Each of holding areas 607, 609, 611 or 613 may temporarily store items associated with a different banking transactions. Some of the holding areas may store deposits and some the holding areas may store currency waiting to be dispensed. Each holding area may temporarily store items until the holding area receives an instruction to release the stored items. For example, recycler 600 may return a deposit to a customer, dispense currency to a requestor or return currency to a storage bin.

Figure 7:
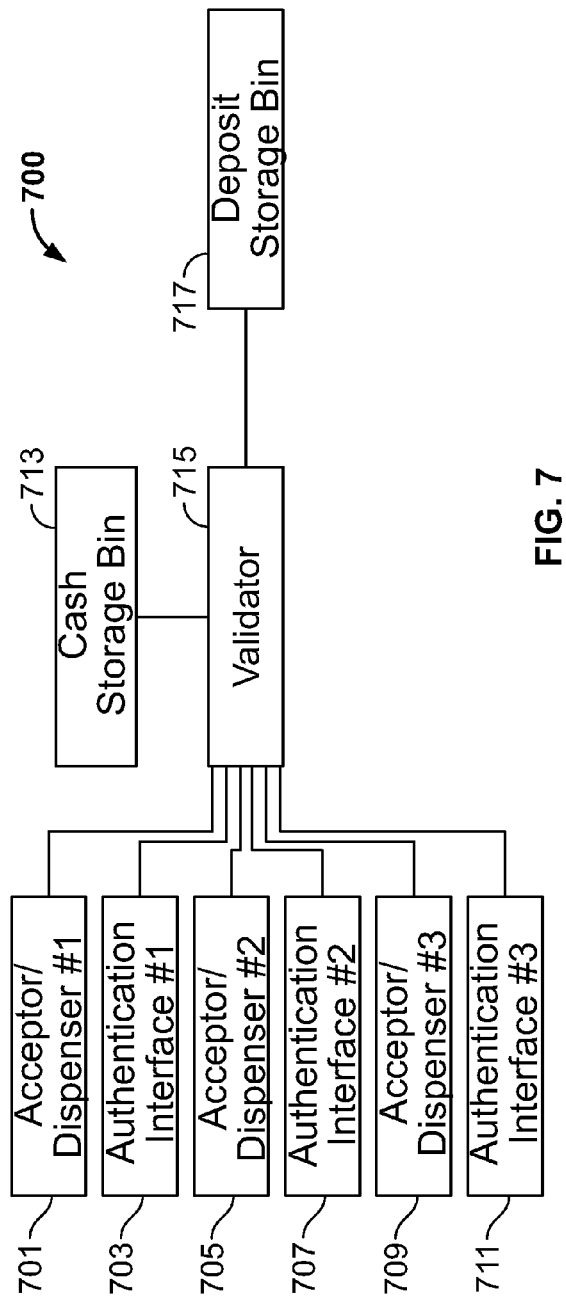
FIG. 7 shows an illustrative apparatus in accordance with the principles of the invention.

FIG. 7 shows illustrative recycler architecture 700. Architecture 700 shows that a recycler may include a plurality of item acceptor/dispensers 701, 705 and 709. Each of the item acceptors/dispensers may be associated with one of authentication interfaces 703, 707 or 711. For example, architecture 700 shows that acceptor/dispenser 705 is associated with authentication interface 707.

An authentication interface may include monitor 406 (shown in FIG. 4), keypad 408 (shown in FIG. 4) and card reader 526 (shown in FIG. 5). Each acceptor/dispenser may be activated based on information entered by a requestor at the authentication interface associated with the acceptor/dispenser. Operation of an acceptor/dispenser may depend on the authentication information entered at the authentication interface associated with the acceptor/dispenser.

For example, if a bank teller enters authentication information, the teller may be able to withdraw three or more different denominations of currency. A bank customer may be limited to two different denominations. As a further example, a commercial banking customer may be allowed to withdraw more currency than an individual banking customer.

Architecture 700 shows that each acceptor/dispenser may be linked to a validator, such as validator 715. In some embodiments, each acceptor/dispenser may be associated with its own dedicated validator.

Architecture 700 shows that each acceptor/dispenser may be linked to a cash storage bin, such as cash storage bin 713. In some embodiments, each acceptor/dispenser may be associated with its own dedicated cash storage bin.

Architecture 700 shows that each acceptor/dispenser may be linked to a deposit storage bin, such as deposit storage bin 717. In some embodiments, each acceptor/dispenser may be associated with its own dedicated deposit storage bin.

Figure 8:
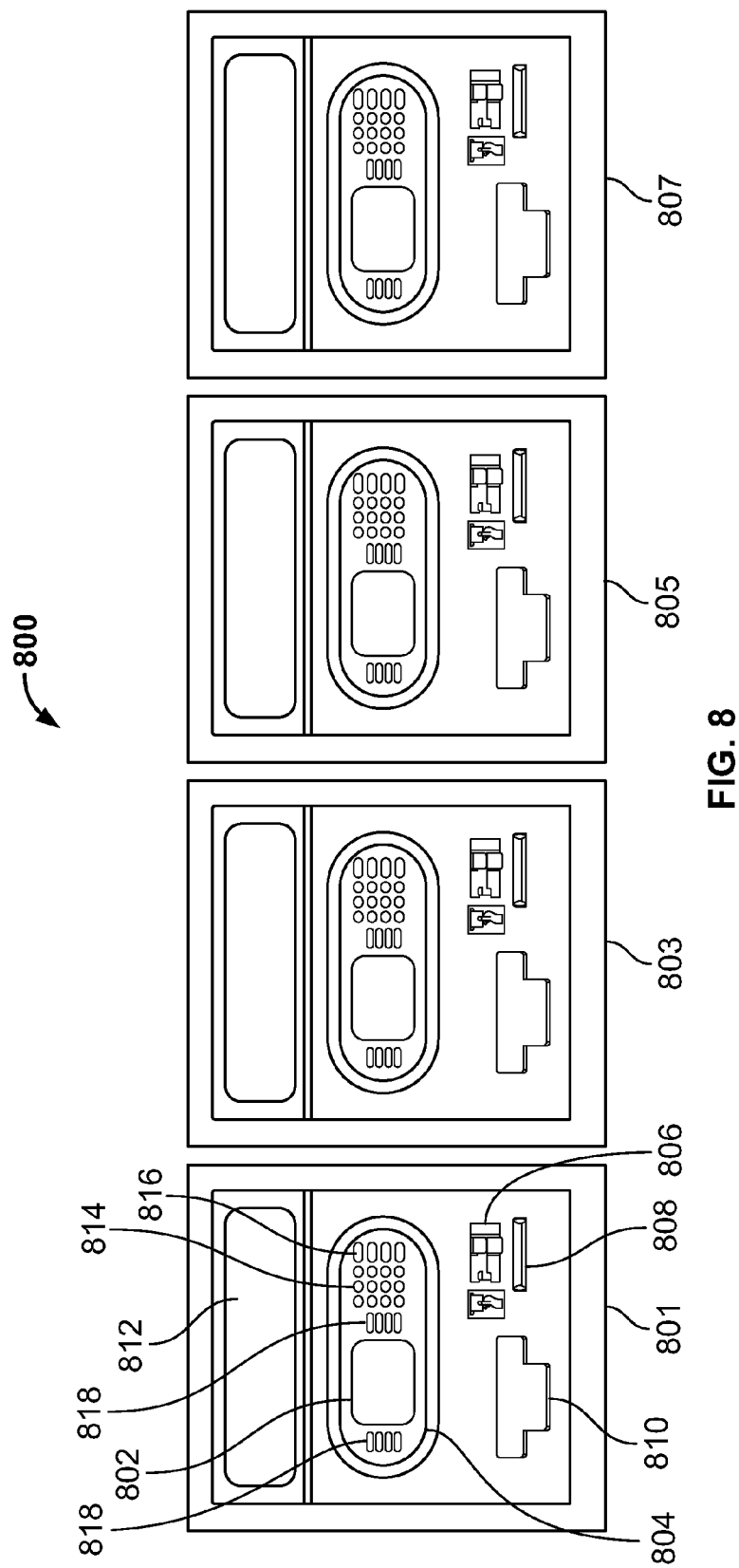
FIG. 8 shows an illustrative apparatus in accordance with the principles of the invention.

FIG. 8 shows illustrative shared recycler 800. Shared recycler 800 includes a plurality of user interfaces 801, 803, 805 and 807. Each of the user interfaces may be used concurrently. Each of the user interfaces may be used to complete a banking transaction initiated at a different transaction station.

Each user interface may include may include monitor 802, keypad 804, card reader port 806, acceptor 808, item dispenser 810 and security screen 812.

Monitor 802 may exchange visual and or audio information with a user. Keypad 804 may include alphanumeric keys 814 for the user to enter numerical and textual data. Keypad 804 may include control keys 816. In some embodiments, control keys 816 may be used to communicate control information, such as instructions, to recycler 800. Keypad 804 may include soft keys 818. Soft keys 818 may have functions that are dictated by programming and are presented to the user using information that may be displayed on monitor 802.

Card reader port 806 may be the front end of any suitable card reader. The card reader may read magnetically encoded information on transaction instruments such as bank cards. In some embodiments (not shown), recycler 800 may include a contactless chip reader, a wireless transceiver or any other suitable interface for exchanging transaction information with a transaction instrument. The transaction instrument may be a chip, an RFID tag, a smart card, a tablet, a smartphone or any other suitable device.

In some embodiments, recycler 800 may include a biometric sensor (not shown). The biometric sensor may authenticate a user based on a feature, such as an anatomical feature, of the user. For example, the biometric sensor may be configured to identify the user based on all or part of a face, a fingerprint, an iris, a retina, a hand or any other suitable anatomical feature. The biometric sensor may identify the user based on a behavioral feature such as a signature, a voice, a gait or any other suitable behavioral feature.

In some embodiments, recycler 800 may include a printer (not shown). The printer may be configured to print checks, receipts or bank cards. Items produced by the printed may be controlled based on authentication information entered by a user. For example, the printer may not print a bank card if authentication information identifies the user as a bank customer. The printer may be enabled to print bank card if the authentication information identifies the user as a banking center employee.

Acceptor 808 may accept any suitable tangible item. For example, acceptor 808 may accept envelopes, deposit forms, bills, checks or any other suitable documents. In some embodiments, acceptor 808 may feed a tangible item into a scanner that digitizes the tangible item for image-based transaction processing.

Item dispenser 810 may dispense tangible items. For example, item dispenser 810 may dispense bills.

Security screen 812 may visually screen a surveillance device (not shown). The surveillance device may provide video information about individuals that are present near recycler 800. The surveillance device may provide video information about conditions near recycler 800.

Each of user interfaces 803, 805 and 807 may include one or more features of user interface 801.

Figure 9:
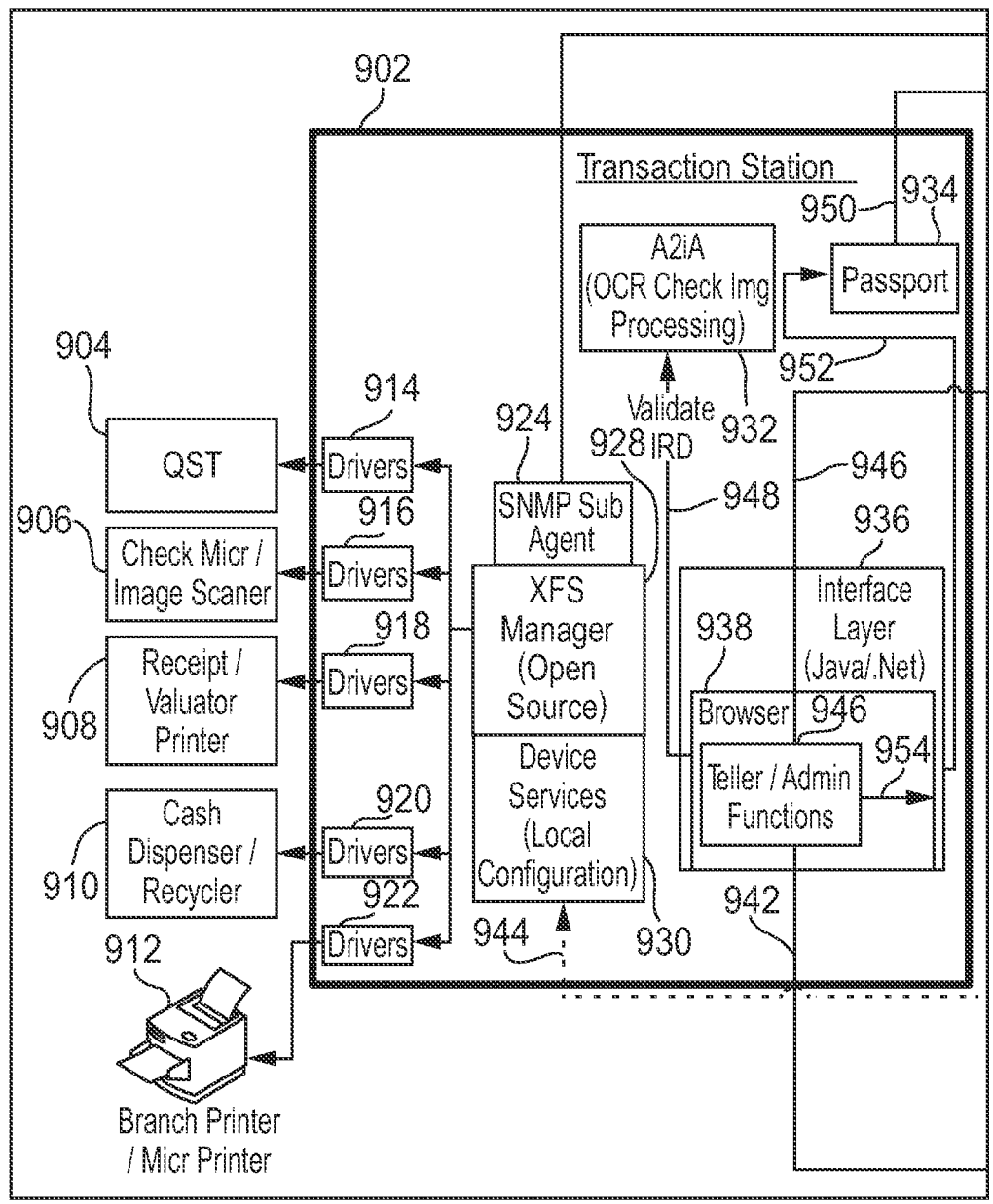
FIG. 9 shows an illustrative apparatus in accordance with the principles of the invention.

FIG. 9 shows illustrative transaction station 902 with exemplary components. Transaction station 902 is shown in the context of use by a bank teller. Transaction station 902 may be located in a banking center. Transaction station 902 may be used by a teller. The teller may perform a banking transaction for a customer using transaction station 902. Transaction station 902 may include hardware, such as a tablet computer and software.

In some embodiments, transaction station 902 may be a component of an ATM. An ATM may be located at a banking center. An ATM may also be located near a banking center, for example, in a banking center parking lot.

Transaction station 902 may include device services (local configuration) 930. Device services 930 may enable a user of transaction station 902 to use a shared device. Device services (local configuration) may receive information from device application services (not shown) via communication line 944. The received information may give the user access to specific shared devices. The received information may also change the permissions of the user to access specific shared devices.

It should be appreciated that QST 904, magnetic ink character recognition ("MICR") scanner/image scanner 906, receipt/valuator printer 908, cash dispenser/recycler 910 and branch printer/MICR printer 912 may each be shared devices, which can be accessed by more than one user.

Extensions for financial services ("XFS") manager 928 may serve as a go-between with drivers 914, 916, 918, 920 and 922, and device services 930. XFS manager may manage the shared devices. XFS manager may also determine how transaction station 902 can and/or should engage with the shared devices.

Device services (local configuration) 930 may communicate with drivers 914, via XFS manager 928. Drivers 914 may provide access to quick service terminal ("QST") 904. A QST may include a card swipe reader, a numeric input keypad or any other suitable device. Permissions to access the QST may be provided to customers initiating a banking transaction. The device services (local configuration) 930 may allow for access to a QST device. In some embodiments, the device services (local configuration) 930 may restrict usage of the QST device to a user who has initiated a banking transaction.

Device services (local configuration) 930 may also communicate with drivers 916, via XFS manager 928. Drivers 916 may provide access to check MICR/image scanner 906. Permissions to access check MICR/image scanner 906 may be provided to a teller engaged in assisting a customer deposit a check. In certain embodiments, check MICR/image scanner 906 may be found in an ATM.

Device services (local configuration) 930 may also communicate with drivers 918, via XFS manager 928. Drivers 918 may provide access to receipt/valuator printer 908. Permissions to access the receipt/valuator printer 908 may be determined by device services 930. Permission may be given to a teller, or a customer who wishes to print a receipt of a banking transaction. Receipt/valuator printer 908 may also be found in an ATM.

Device services (local configuration) 930 may also communicate with drivers 920, via XFS manager 928. Drivers 920 may provide access to cash dispenser/recycler 910. Permissions to access cash dispenser/recycler 910 may be determined by device services. Permissions may be given to a teller, or customer who may deposit, or withdraw, cash to during a banking transaction.

Device services (local configuration) 930 may also communicate with drivers 922, via XFS manager 928. Drivers 922 may provide access to branch printer/MICR printer 912. Permissions to access branch printer/MICR printer 912 may be determined by device services 930. Permissions may be given to a teller, or a customer, who may print a banking transaction statement.

SNMP (Simple Network Management Protocol) sub agent 924 may be a hardware exception handling protocol. SNMP sub agent may determine or receive notification, when a printer device runs out of paper. SNMP sub agent may also determine or receive notification, when a device jams or a cash dispenser device depleted its cash. SNMP sub agent 924 may communicate with XFS manager 928. SNMP sub agent may also communicate with extended messaging services ("XMS") (not shown).

Transaction station 902 may also include browser 938. Browser 938 may allow a user to access the internet—e.g., for the purpose of accessing an online banking service. Transaction station 902 may also include teller/admin functions 940. Teller/admin functions 940 may interact with browser 938 via connection 954. Teller/admin functions 940 may also communicate, via communication line 946, with a branch processor (not shown). Teller/admin functions 940 may also communicate with a teller application server via communication line 942.

Interface layer (Java®/.Net) 936 may enable browser 938 to communicate with the internet by providing the necessary protocols. The protocols used to communicate with browser 938 may include Java®. The protocols used to communicate with browser 938 may include the Microsoft® .Net Framework.

Browser 938 may communicate with A2iA® software (Object character recognition ("OCR") check image processing) 932, via communication line 948. A2iA® software 932 may validate a check. In order for a check to be validated by A2iA® software 932, the check should preferably include the required components of an Image Replacement Document ("IRD") document. If A2iA® determines that a check includes the required components of an IRD document, the check may be validated.

When a check is validated, relevant information may be transmitted to browser 938. The relevant information may then be transferred from browser 938 to interface layer 936. The relevant information may then be transferred from interface layer 936 to passport 934, via communication line 952. Passport 934 may convert the check to an IRD electronic document. Passport 934 may transmit the IRD electronic document to Universal Landing Zone ("ULZ") such as ULZ 1106 (shown in FIG. 11), via communication line 950. Passport 934 may provide a response to interface layer 936 regarding the authorization of the check.

Figure 10:
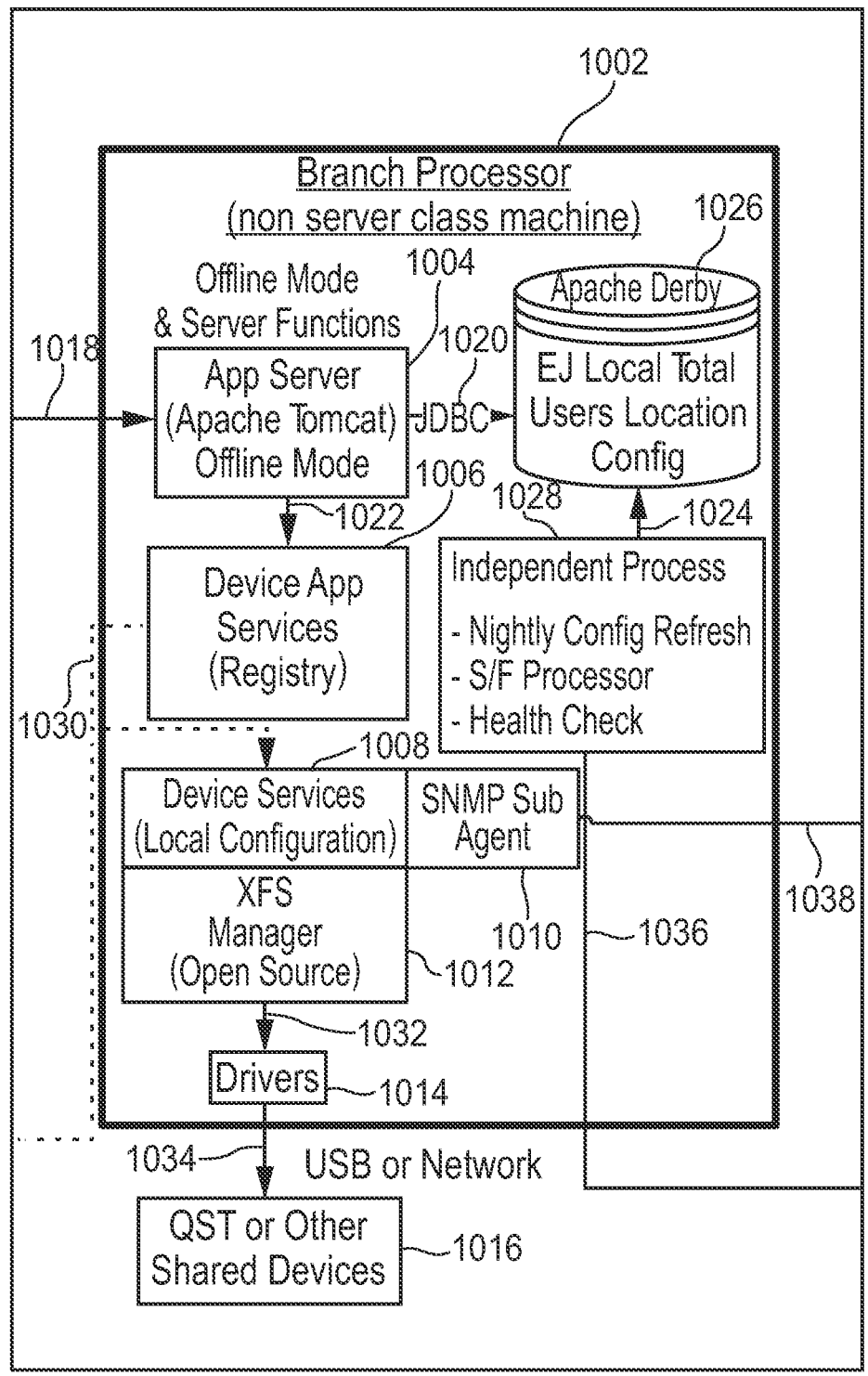
FIG. 10 shows an illustrative apparatus in accordance with the principles of the invention.

FIG. 10 shows branch processor 1002 with exemplary components. Branch processor 1002 may include device application services (registry) 1006. Device application services (registry) 1006 may identify what types of devices are available. Device application services (registry) 1006 may also identify what denominations are contained in a shared cash recycler. Device application services (registry) 1006 may also identify how many shared devices are available, etc. Device application services (registry) 1006 may communicate, via communication line 1030, with a device services (local configuration) 1008 via communication line 1030. XFS manager 1012 may be a device manager. XFS manager may act as a go-between between the device services (local configuration) 1008 and drivers 1014, using communication line 1032. Drivers 1014 may provide access to QST or other shared devices 1016, via communication line 1034.

Branch processor 1002 may also include SNMP sub agent 1010. SNMP sub agent 1010 may be a hardware exception handler. SNMP sub agent 1010 may communicate with XMS (not shown), via communication line 1038.

It should be appreciated that Branch processor 1002 includes all the necessary components to execute the tasks performed by a transaction station. These components include device services (local configuration) 1008, XFS manager 1012, drivers 1014 and communication line 1034, SNMP sub agent 1010 and branch processor 1002.

Branch processor 1002 may include application server (Apache Tomcat™) offline mode 1004. Application server 1004 may be a processor which enables branch processor 1002 to remain active during service degradation. Application server 1004 may have degraded, or offline mode capabilities. These capabilities may include withdrawal of cash, up to a predetermined amount; deposit of checks; and cashing of checks, up to a predetermined amount; and/or any suitable capabilities in degraded mode. Application server 1004 may communicate with device application 1006, via communication line 1022. Application server may receive communications from teller/admin functions (not shown) via communication line 1018. Application server 1004 may also communicate with Electronic Journal ("EJ") 1026, via protocol Java® database connectivity ("JDBC") 1020.

EJ 1026 may record and save substantially all incomplete and completed banking transactions that occur in branch processor 1002. The contents of EJ 1026 may be transmitted to a data center (not shown) when application server 1004 is operated in a degraded mode.

Branch Processor 1002 may also include independent process 1028. Independent process 1028 may monitor the health of the processor 1002, as well as perform a nightly configuration refresh. A nightly configuration refresh may cause independent process 1028 restart and/or reconfigure processor 1002. Independent process 1028 may also communicate with EJ 1026, via communication line 1024. Independent process 1028 may also communicate with a teller application server at a data center, such as data center 1102 (shown in FIG. 11) via communication line 1036.

Figure 11:
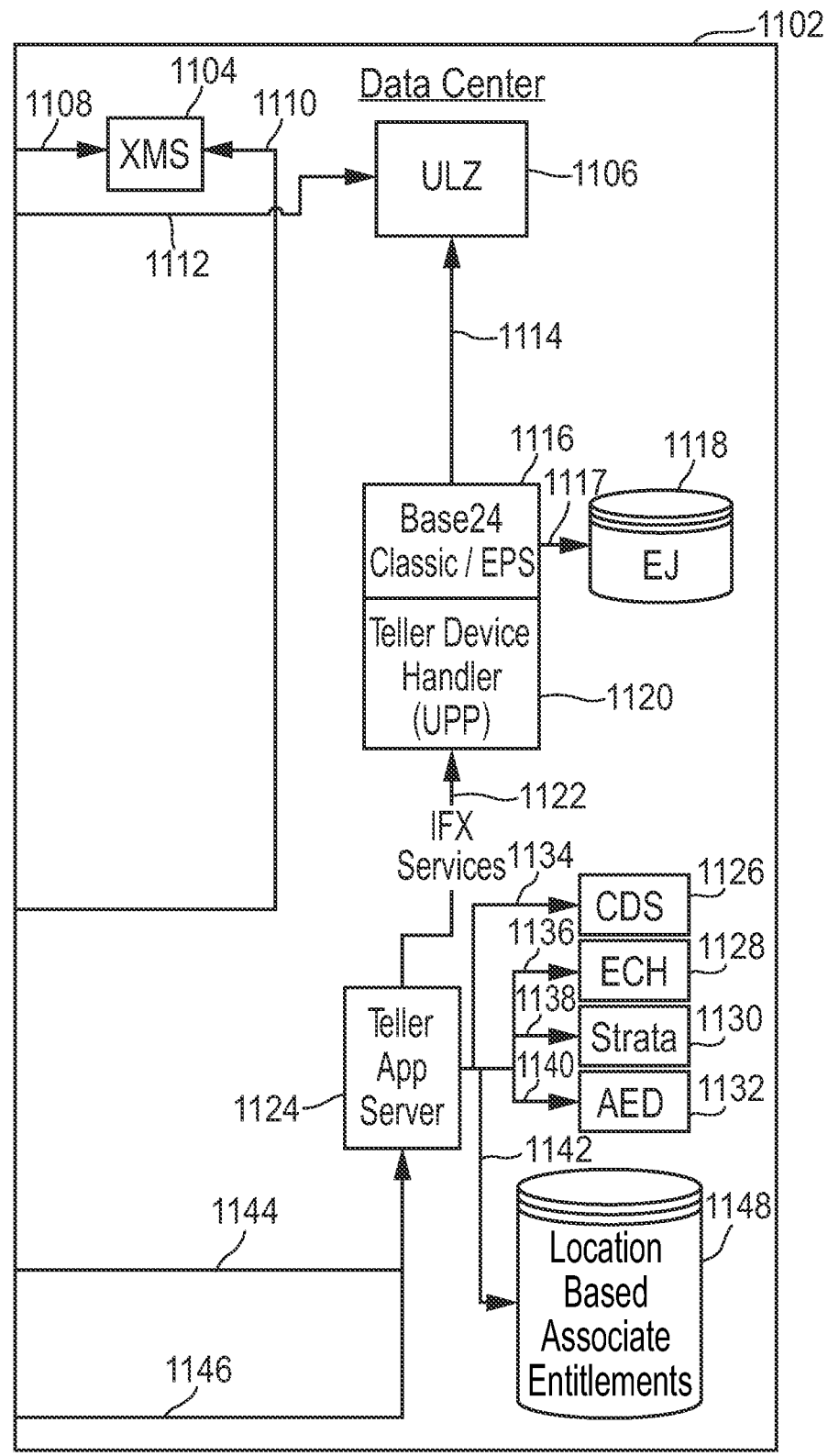
FIG. 11 shows an illustrative apparatus in accordance with the principles of the invention.

FIG. 11 shows data center 1102 with exemplary components. Data center 1102 may include XMS 1104. XMS 1104 may communicate with SNMP, via communication lines 1108 and 1110. SNMP, as described above, may be located on a transaction station such as transaction station 902 (shown in FIG. 9) or a branch processor, such as branch processor 1002 (shown in FIG. 10). XMS may transmit messages to SNMP located on the branch processor and the desktop application.

Data center 1102 may include ULZ 1106. ULZ 1106 may enable transfer of money between different financial institutions. ULZ may also enable transfer of money within a financial institution. ULZ 1106 may receive instructions to transfer money from based on information captured by Passport 934 (show in FIG. 9) and transmitted over communication line 1112. ULZ 1106 may also receive IRD documents from Passport 934 over communication line 1112. Passport 934 may be located on a transaction station 902, as shown in FIG. 9. ULZ may also receive transfer instructions from Base24 Classic/EPS 1116 via communication line 1114.

Base24 Classic/EPS 1116 may be a server. Base24 1116 may transmit substantially all steps of initiated banking transactions to EJ 1118 via communication line 1117. EJ 1118 may record and save substantially all steps of banking transactions received. Base24 1116 may be connected to Teller Device Handler (Universal Payment Platform ("UPP")) 1120. Financial Messaging Protocol ("IFX") services 1122 may be customized to create a customized IFX device handler. A customized IFX device handler may allow for commercial deposits, dozens of check deposits and degraded server mode.

Using conventional UPP tools, IFX services 1122 may be transmitted from teller application server 1124. Teller application server 1124 may include one or more features of server 101 (shown above in FIG. 1). Teller application server 1124 may identify the distribution of cash requested using at substantially all branch processors and transaction stations. Communication lines 1144 may link branch processors with teller application server 1124. Communication lines 1146 may link transaction stations with teller application server 1124.

Teller application server 1124 may communicate with Customer data store ("CDS") 1126 via communication line 1134. CDS 1126 may include the capabilities to identify account information. The account information may be account information which occurred during a pre-determined time such as business day.

Teller application server 1124 may communicate via communication line 1136 with ECH 1128. ECH 1128 may store data for an entire banking center or financial institution. Using ECH 1128, the teller application server may identify account data regardless of where the transaction occurred.

Teller application server 1124 may communicate via communication line 1138 with Strata 1130. Strata 1130 may store images. Strata 1130 may also store images regarding signatures of customers. The saved signatures of customers may be used for verification of customer signatures.

Teller application server 1124 may communicate with associate entitlement database ("AED") 1132 via communication line 1140. AED 1132 may include entitlements and identification of associates.

Teller application server 1124 may also communicate with location-based associate entitlements 1148 via communication line 1142.

Figure 12:
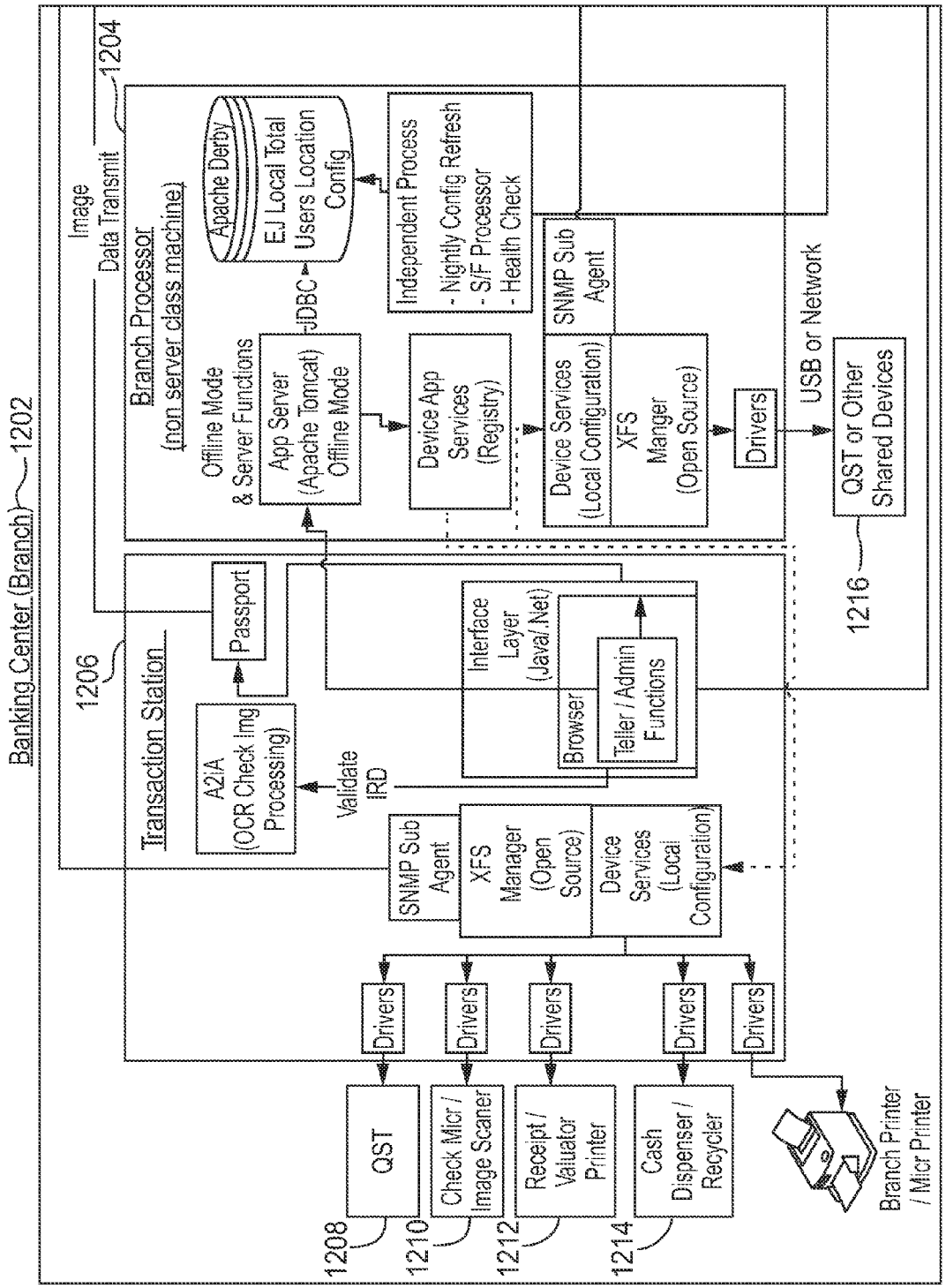
FIG. 12 shows an illustrative apparatus in accordance with the principles of the invention.

FIG. 12 shows banking center (branch) 1202. Banking center (branch) 1202 may include branch processor 1204. Branch processor 1204 may include one or more features of branch processor 1002 (shown above in FIG. 10). Banking center (branch) 1202 may also include transaction station 1206. Banking center (branch) 1202 may also include shared devices, including QST 1206, check MICR/image scanner 1210, receipt/valuator printer 1212, cash dispenser/recycler 1214 and QST or other shared devices 1216. Banking center (branch) 1202 may include more than one branch processor. Banking center (branch) 1202 may also include more than one transaction station. The shared devices, as described above, may be used by multiple transaction stations and branch processors within a banking center.

Thus, systems and methods for a pooled currency delivery system have been provided. Persons skilled in the art will appreciate that the present invention can be practiced by other than the described embodiments, which are presented for purposes of illustration rather than of limitation. The present invention is limited only by the claims that follow.

What is claimed is:

1. A currency delivery system at a banking center, the system comprising:
   an automated teller machine ("ATM") at a first location within the banking center;
   a teller station at a second location within the banking center, the teller station comprising a quick service terminal ("QST");
   a shared cash recycler at a third location within the banking center; and
   a network within the banking center linking the ATM and the teller station to the shared cash recycler;
   the shared cash recycler comprising:
      a processor configured to receive, over the network:
         a first request for a first amount of cash from the ATM; and
         a second request for a second amount of cash from the teller station;
      a first slot for dispensing the first amount of cash in response to the first request; and
      a second slot for dispensing the second amount of cash in response to the second request;
   wherein:
      when a cash dispensing functionality of the ATM is malfunctioning, the ATM transmits the first request to the shared cash recycler; and
      when the cash dispensing functionality of the ATM is operational, the ATM dispenses the first amount of cash and does not transmit the first request to the shared cash recycler.

2. The currency delivery system of claim 1 wherein the shared cash recycler further comprises:
   a storage bin holding a cash supply;
   a picker configured to extract at least one bill from the cash supply;
   a validator configured to determine a value of the at least one bill extracted from the cash supply; and
   a track configured to transport the at least one bill;
wherein, in response to receiving the first request from the ATM:
   the picker extracts a first number of bills from the storage bin;
   the validator determines the value of the first number of bills;
   the track transports the first number of bills to the first slot in the cash recycler; and
wherein, in response to receiving the second request from teller station:
   the picker extracts at least a second number of bills from the cash supply;
   the validator determines the value of the second number of bills; and
   the track transports the second number of bills to the second slot in the cash recycler.

3. The currency delivery system of claim 1 wherein:
   the second location is at least fifteen feet away from the first location.

4. The currency delivery system of claim 1 wherein:
   the QST comprises a tablet computer located at least fifteen feet away from the first location.

5. The currency delivery system of claim 1, the shared cash recycler further comprising:
   a first authentication interface associated with the first slot; and
   a second authentication interface associated with the second slot;
wherein each authentication interface comprises at least two of:
   a screen;
   a card reader;
   a biometric scanner; and
   a keypad.

6. The currency delivery system of claim 5 wherein in response to first authentication information received using the first authentication interface, the shared cash recycler is configured to:
   match the first authentication information to the first request or the second request; and
   dispense the amount of cash corresponding to the matched request using the first slot.

7. The currency delivery system of claim 1, the shared cash recycler further comprising a cash acceptor and the processor further configured to receive, over the network, a request to deposit a third amount of cash;
wherein, in response to receiving the deposit request, the cash acceptor is configured to receive the third amount of cash and transfer the third amount of cash into the shared recycler.

8. A currency delivery system at a banking center, the system comprising:
   a first transaction station at a first location within the banking center;
   a second transaction station at a second location within the banking center;
   a shared cash recycler at a third location within the banking center; and
   a network within the banking center linking the first transaction station and the second transaction station to the shared cash recycler;
   the shared cash recycler comprising:
      a processor configured to receive, over the network:
         a first request for a first amount of cash from a first requestor via the first transaction station; and
         a second request for a second amount of cash from a second requestor via the second transaction station;
      a first holding area inside the shared cash recycler for storing cash corresponding to the first request;
      a second holding area inside the shared cash recycler for storing cash corresponding to the second request;
      a single dispensing slot; and
      an authentication interface;

wherein:
the first transaction station is at least fifteen feet away from the shared cash recycler;
the second transaction station is at least fifteen feet away from the shared cash recycler; and wherein, the shared cash recycler is configured to:
transfer the first amount of cash to the first holding area before the first requestor accesses the authentication interface;
transfer the second amount of cash to the second holding area before the second requestor accesses the authentication interface;
at a first time, using the single dispensing slot, dispense cash stored in the first holding area in response to authentication of the first requestor using the authentication interface; and
at a second time, using the single dispensing slot, dispense cash stored in the second holding area in response to authentication of the second requestor using the authentication interface.

9. The currency delivery system of claim 8 wherein the shared cash recycler is configured to dispense cash from the second holding area prior to dispensing cash from the first holding area.

10. The currency delivery system of claim 8 wherein the shared cash recycler further comprises:
a storage bin holding a cash supply;
a picker configured to extract at least one bill from the cash supply;
a track configured to transport the at least one bill; and
a validator configured to determine a value of the at least one bill extracted from the cash supply;

wherein, in response to receiving the first request from the first transaction station:
the picker extracts at least a first number of bills from the storage bin;
the validator determines the value of the first number of bills;
the track transports the first number of bills to the first holing area; and wherein, in response to receiving the second request from the second transaction station:
the picker extracts at least a second number of bills from the cash supply;
the validator determines the value of the second number of bills; and
the track transports the second number of bills to the second holding area.

11. The currency delivery system of claim 8 wherein, the shared cash recycler is configured to return cash stored within the first holding area to a storage bin after a pre-determined time interval.

12. The currency delivery system of claim 8 wherein:
the first transaction station is an automated teller machine; and
the second transaction station is a teller-client workstation located at least fifteen feet away from the first location.

13. A method for delivering currency within a banking center, the method comprising:
using a first transaction station:
initiating a first request for a first amount of cash from a first customer; and
directing the first customer to a shared cash recycler;

using a second transaction station:
initiating a second request for a second amount of cash from a second customer; and
directing the second customer to the shared cash recycler;

using a network within the banking center:
transferring the first request to the shared cash recycler; and
transferring the second request to the shared cash recycler; and using the shared cash recycler:
before authenticating the first customer, transferring the first amount of cash from a storage bin in the shared cash recycler to a first holding area in the shared cash recycler;
before authenticating the second customer, transferring the second amount of cash from the storage bin in the shared cash recycler to a second holding area in the shared cash recycler;
authenticating the first customer;
in response to authenticating the first customer, dispensing the first amount of cash stored in the first holding area to the first customer;
authenticating the second customer; and
in response to authenticating the second customer, dispensing the second amount of cash stored in the second holding area to the second customer.

14. The method of claim 13 further comprising:
authenticating the first customer using a first authentication interface of the shared cash recycler; and
authenticating the second customer using a second authentication interface of the shared cash recycler.

15. The method of claim 13 further comprising:
dispensing the first amount of cash from a first slot of the shared cash recycler; and
dispensing the second amount of cash from a second slot of the shared cash recycler.

16. The method of claim 13 further comprising:
using a teller workstation, receiving a third request for a third amount of cash initiated by a teller;
directing the teller to the shared cash recycler;
using the network within the banking center transferring the third request to the shared cash recycler; and
using the shared cash recycler:
authenticating the teller; and
in response to authenticating the teller:
retrieving the third amount of cash from the storage bin within the shared cash recycler; and
dispensing the third amount of cash to the teller.

17. The method of claim 13 further comprising:
using a teller workstation, receiving a request to deposit a third amount of cash initiated by a teller;
directing the teller to the shared cash recycler;
using the network within the banking center transferring the deposit request to the shared cash recycler; and
using the shared cash recycler:
authenticating the teller; and
in response to authenticating the teller:
activating an acceptor of the shared cash recycler; and
using the acceptor, transferring the third amount of cash to the storage bin within the shared cash recycler.

* * * * *